US007151234B2

(12) United States Patent
Wolpert et al.

(10) Patent No.: US 7,151,234 B2
(45) Date of Patent: Dec. 19, 2006

(54) OUTLET PANEL FOR SINGLE PIN CONNECTORS

(76) Inventors: Richard Wolpert, 11 Ripley Dr., Northport, NY (US) 11768; Raymond Wolpert, 15 Colony Ct., Greenlawn, NY (US) 11740

( * ) Notice: Subject to any disclaimer, the term of this patent is extended or adjusted under 35 U.S.C. 154(b) by 309 days.

(21) Appl. No.: 10/412,761

(22) Filed: Apr. 10, 2003

(65) Prior Publication Data

US 2004/0201934 A1 Oct. 14, 2004

(51) Int. Cl.
*H01R 33/96* (2006.01)
*H02J 3/00* (2006.01)
*H01H 33/59* (2006.01)

(52) U.S. Cl. ....................... 200/51.09; 307/38; 307/39; 307/115; 307/134

(58) Field of Classification Search .............. 200/51.09
See application file for complete search history.

(56) References Cited

U.S. PATENT DOCUMENTS 3,596,019 A * 7/1971 Koester ................... 200/51.09
3,617,662 A * 11/1971 Miller ..................... 200/51.09
3,755,635 A * 8/1973 McGill ..................... 200/51.09
4,853,823 A * 8/1989 Arechavaleta et al. ....... 361/100
5,069,632 A * 12/1991 Avitan ..................... 200/51.09
5,095,182 A * 3/1992 Thompson ............... 200/51.09
5,113,045 A * 5/1992 Crofton ................... 200/51.09
5,844,326 A * 12/1998 Proctor et al. ................ 307/34
5,998,744 A * 12/1999 Osborn .................... 200/50.28
6,455,789 B1 * 9/2002 Allison .................... 200/51.09
6,580,344 B1 * 6/2003 Li ............................... 335/18
6,749,449 B1 * 6/2004 Mortun et al. .............. 439/188
2002/0112945 A1 * 8/2002 Lawson et al. .......... 200/51.09

* cited by examiner

*Primary Examiner*—Brian Sircus
*Assistant Examiner*—Hal I. Kaplan
(74) *Attorney, Agent, or Firm*—Kenyon & Kenyon LLP

(57) ABSTRACT

A device for providing electrical power that includes one or more single pin outlets and one or more switches, each of the switches coupled to a respective one of the one or more single pin outlets. The at least one switch is actuatable by insertion of a pin in the single pin outlet. The device also includes a current device coupled to the one or more switches and configured to prevent the flow of electrical current to the single pin outlets unless all of the switches are actuated. Thus, the device is configured to prevent the flow of electrical power to all of the single pin outlets unless all of the single pin outlets have a pin properly inserted therein.

4 Claims, 2 Drawing Sheets

OUTLET PANEL FOR SINGLE PIN CONNECTORS

FIELD OF THE INVENTION

The present invention relates to electrical outlet panels, and in particular to an outlet panel for single pin connectors.

BACKGROUND INFORMATION

The single pin connector electrical outlet panel is widely used in various industries such as mining, entertainment (theater, circus, film, etc.), marine, water treatment and many other applications. These single pin devices are commonly referred to as "cam-locks".

One of the problems associated with conventional single pin connector electrical outlet panels is the fact that the single pin outlet has a brass contact that is tube-shaped and that is typically large enough to have inserted therein a finger or other foreign object. Since these outlets may often carry 400 amps AC @240V, the insertion of a finger or other foreign object into the single pin outlet may result in serious injury or death. The danger of such an occurrence has resulted in the National Electrical Code requiring the posting of warning signs on equipment provided with this sort of single pin outlet.

Thus, there is a need for a system and method for providing a single pin connector electrical outlet panel that is safer to use than conventional single pin connector electrical outlet panels.

SUMMARY OF THE INVENTION

The present invention, in accordance with various embodiments thereof, is directed to a device for providing electrical power that includes one or more single pin outlets and one or more relay switches, each of the relay switches coupled to a respective one of the single pin outlets. The relay switches are actuatable by insertion of a pin or plug (hereinafter referred to collectively as "a pin") in the single pin outlet. The device also includes a current device coupled to the one or more relay switches and configured to prevent the flow of electrical current to the single pin outlets unless all of the relay switches are actuated. Thus, the device is configured to prevent the flow of electrical power to all of the single pin outlets unless all of the single pin outlets have a pin properly inserted therein. The single pin connector electrical outlet panel may also include a second switch that is connected to the relay switches and to the current device.

According to one embodiment of the present invention, the relay switches are connected to each other in parallel and are normally closed. The device also includes a shunt trip connected to the current device, which may be a current limiting device, and configured upon activation to de-energize the current device, and a second switch, the second switch connected to the relay switches and to the shunt trip. The second switch is normally open, and is configured such that when any of the relay switches are closed, the second switch closes and activates the shunt trip to de-energize the current device, thereby preventing the flow of electrical current to the single pin outlets.

According to one embodiment of the present invention, the relay switches are connected to each other in series and are normally open. The device also includes a shunt trip connected to the current device, which may be an overcurrent device, and configured upon activation to de-energize the current device, and a second switch, the second switch connected to the relay switches and to the shunt trip. In this embodiment, the second switch is normally closed, and is configured such that when any of the relay switches are closed, the second switch is caused to open and activate the shunt trip to de-energize the current device, thereby preventing the flow of electrical current to the single pin outlets.

DETAILED DESCRIPTION

Figure 1:
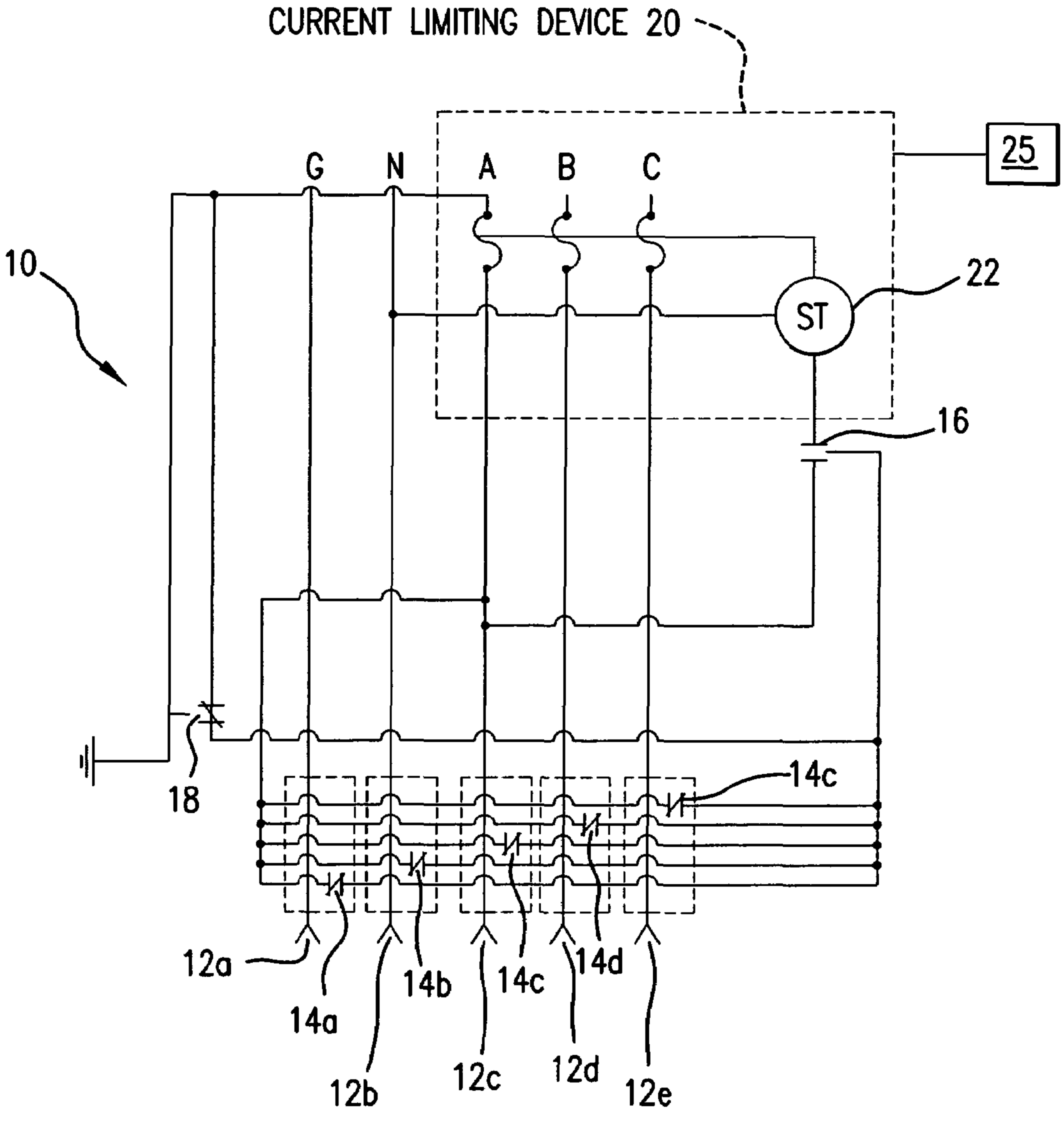
FIG. 1 illustrates schematically a single pin connector electrical outlet panel, in accordance with one embodiment of the present invention.

The present invention is directed to a single pin connector electrical outlet panel. FIG. 1 illustrates schematically a single pin connector electrical outlet panel 10 in accordance with one embodiment of the present invention. The single pin connector electrical outlet panel 10 includes at least one single pin outlet 12. While FIG. 1 illustrates the single pin connector electrical outlet panel 10 having five single pin outlets 12, e.g., the single pin outlets 12*a* to 12*e*, the present invention contemplates that the single pin connector electrical outlet panel 10 may have any number of single pin outlets 12.

The single pin connector electrical outlet panel 10 also includes at least one switch 14. Each one of the switches 14 is coupled to a corresponding one of the single pin outlets 12. Thus, in the embodiment shown in FIG. 1, each switch 14*a* to 14*e* is coupled to a corresponding single pin outlet 12*a* to 12*e*, respectively. The switches 14*a* to 14*e*, according to one embodiment of the present invention, are normally-closed, externally-mounted relay switches. Advantageously, each of the single pin outlets 12*a* to 12*e* is a cam-lock type outlet that contains a spring-loaded pin that contacts, e.g., pushes against, its corresponding externally-mounted relay switch 14*a* to 14*e* when a pin is inserted into the single pin outlet. In the embodiment shown in FIG. 1, the switches 14*a* to 14*e* are connected in parallel.

The single pin connector electrical outlet panel 10 also includes a current limiting device 20, e.g., a circuit breaker, motor controllers, fused or non-fused switches, etc., that provides electrical power to the single pin outlets 12*a* to 12*e*. In addition, the single pin connector electrical outlet panel 10 includes a second switch 16, e.g., a relay switch, that is connected to the switches 14*a* to 14*e* and to the current limiting device 20. When any of the switches 14*a* to 14*e* are closed, the resulting complete circuit triggers the second switch 16 to activate a shunt trip 22 that de-energizes the current limiting device 20. Once de-energized, the current limiting device 20 is prevented from providing electrical power to all of the single pin outlets 12*a* to 12*e*. Thus, unless all the single pin outlets 12*a* to 12*e* have pins inserted therein, at least one of the switches 14*a* to 14*e* will be closed, thereby causing the shunt trip 22 to de-energize the current limiting device 20 and all of the single pin outlets 12*a* to 12*e*.

According to one embodiment of the present invention, all, e.g., three, of the electrical phase legs controlled by the current limiting device 20 may be combined to create a current used to activate the de-energizing mechanism. In this embodiment, a rectifier such as rectifier 25 illustrated in FIG. 1, may be employed. The rectifier 25 operates to clip half of the waveform from the three AC phase legs and creates a DC voltage. According to this embodiment, this DC voltage may then be employed to control the switches and the shunt trip 22 so as to cause the shunt trip 22 to de-energize the current limiting device 20 and all of the single pin outlets 12*a* to 12*e*. Employing a rectifier to combine the three electrical phase legs in this manner improves the safety of the single pin connector electrical outlet panel 10 in that a control voltage is present even if one or two of the electrical phase legs fails. An arrangement of this type may ensure that, if one or two of the electrical phase legs fail, a third electrical phase leg that is present will operate to de-energize the single pin outlets 12*a* to 12*e* upon the removal of one or more pins from the single pin outlets 12*a* to 12*e*. In another embodiment of the present invention, the electrical system of the single pin connector electrical outlet panel 10 is provided with an "all-or-nothing" arrangement, e.g, either all of the electrical phase legs are present, or all of the electrical phase legs drop out. In still another embodiment of the present invention, AC switching is employed. In this embodiment of the present invention, a rectifier is not employed. Instead, the AC switching recognizes only one of the electrical phase legs. According to this arrangement, however, regardless whether the other two electrical phase legs are present, the shunt trip 22 will operate to de-energize the current limiting device 20 (and consequently the single pin outlets 12*a* to 12*e* would be de-energized) upon the presence of the recognized electrical phase leg.

In addition, according to one embodiment of the present invention, the single pin connector electrical outlet panel 10 may be configured to ensure ground integrity. For example, in the embodiment shown in FIG. 1, the single pin connector electrical outlet panel 10 includes a third switch 18, e.g., a relay switch. The third switch 18, according to one embodiment of the present invention, is a normally-closed relay switch. The third switch 18 controls a secondary circuit that trips the current limiting device 20, thereby preventing electrical power from flowing to the single pin outlets 12*a* to 12*e*, unless a connection to earth ground G is established and maintained. FIG. 1 also illustrates a node N electrically connected to the ground G.

Figure 2:
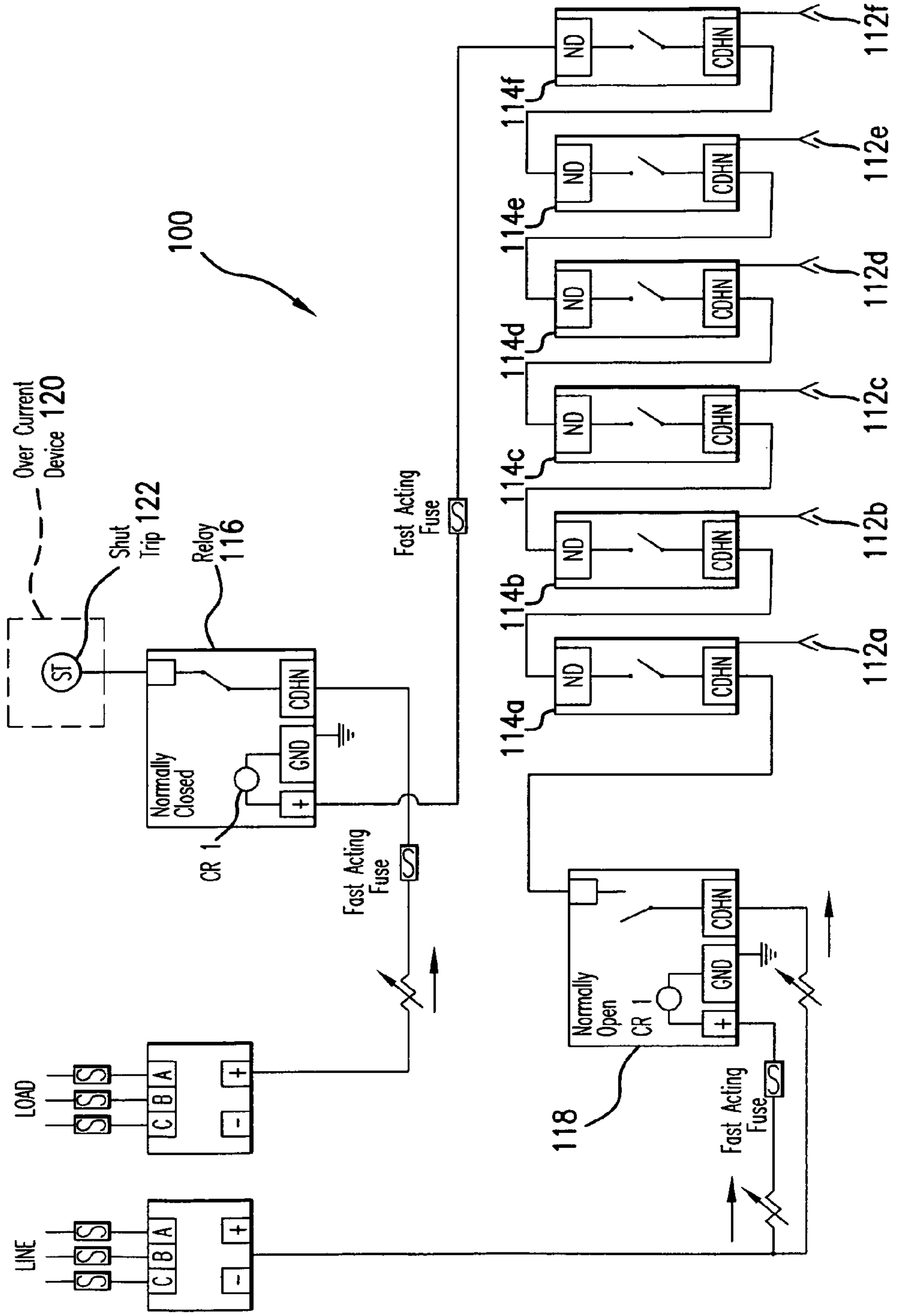
FIG. 2 illustrates schematically a single pin connector electrical outlet panel, in accordance with another embodiment of the present invention.

FIG. 2 illustrates schematically a single pin connector electrical outlet panel 100 in accordance with another embodiment of the present invention. The single pin connector electrical outlet panel 100 includes at least one single pin outlet 112. While FIG. 2 illustrates the single pin connector electrical outlet panel 100 having six single pin outlets 112, e.g., the single pin outlets 112*a* to 112*f*, the present invention contemplates that the single pin connector electrical outlet panel 100 may have any number of single pin outlets 112. According to one embodiment of the present invention, one or more of the single pin outlets may be a neutral outlet.

The single pin connector electrical outlet panel 100 also includes at least one switch 114. Each one of the switches 114 is coupled to a corresponding one of the single pin outlets 112. Thus, in the embodiment shown in FIG. 2, each switch 114*a* to 114*f* is coupled to a corresponding single pin outlet 112*a* to 112*f*, respectively. The switches 114*a* to 114*f*, according to one embodiment of the present invention, are normally-open externally mounted relay switches. As described more fully above, each of the single pin outlets 112*a* to 112*f* may be a cam-lock type outlet that contains a spring-loaded pin that contacts, e.g., pushes against, its corresponding relay switch 114*a* to 114*f* when a pin is inserted into the single pin outlet. In the embodiment shown in FIG. 2, the switches 114*a* to 114*e* are connected in series.

The single pin connector electrical outlet panel 100 also includes an overcurrent device 120, that provides electrical power to the single pin outlets 112*a* to 112*f*. In an alternative embodiment, the single pin connector electrical outlet panel 100 may include a switch instead of the overcurrent device 120 in those applications where overcurrent protection is not required. In addition, the single pin connector electrical outlet panel 100 includes a second switch 116, e.g., a relay switch, that is connected to the switch 114*f* and to the overcurrent device 120. The second switch 116 may be a normally-closed relay switch that is connected to a shunt trip 122 of the overcurrent device 120. When at least one of the switches 114*a* to 114*f* are open, e.g., when at least one of the corresponding single pin outlets 112*a* to 112*f* does not have a pin properly inserted therein, the second relay 116 will be closed and the shunt trip 122 is activated so as to prevent the overcurrent device 120 from providing electrical current to the single pin outlets 112*a* to 112*f*. When all of the switches 114*a* to 114*f* are closed, e.g., when all of the corresponding single pin outlets 112*a* to 112*f* have pins properly inserted therein, the resulting complete circuit causes the second switch 116 to close. As a result, the shunt trip 122 is deactivated and the overcurrent device 120 provides electrical power to the single pin outlets 112*a* to 112*f*. In other words, unless all the single pin outlets 112*a* to 112*f* have pins properly inserted therein, at least one of the switches 114*a* to 114*f* will be open, thereby causing the overcurrent device 120 to be tripped and the single pin outlets 112*a* to 112*f* to be de-energized.

According to one embodiment of the present invention, the single pin connector electrical outlet panel 100 may include 1, 2 or 3 phase legs. Furthermore, according to one embodiment of the present invention, all of the electric phases controlled by the current limiting device 20 may be combined to create a current used to activate the de-energizing mechanism. As described more fully above, in one embodiment of the present invention, a rectifier may be employed to clip half of the waveform from the three AC phase legs and create a DC voltage. According to this embodiment, this DC voltage may then be employed to control the switches and the shunt trip 122 so as to cause the shunt trip 122 to de-energize the overcurrent device 120 and all of the single pin outlets 112*a* to 112*f*. As mentioned previously, employing a rectifier to combine the three electrical phase legs in this manner improves the safety of the single pin connector electrical outlet panel 100 in that a control voltage is present even if one or two of the electrical phase legs fails. An arrangement of this type may ensure that, if one or two of the electrical phase legs fail, a third electrical phase leg that is present will operate to de-energize the single pin outlets 112*a* to 112*e* upon the removal of one or more pins from the single pin outlets 112*a* to 112*f*. In other embodiments of the present invention, a single electrical phase leg may be employed, thereby providing the electrical system of the single pin connector electrical outlet panel 100 with an "all-or-nothing" arrangement, or else AC switching is employed such that, regardless of whether the other two electrical phase legs are present, the shunt trip 212 would not operate to de-energize the overcurrent device 120 (and consequently the single pin outlets 112*a* to 112*f* would not be de-energized) upon the failure of a recognized electrical phase leg.

In addition, according to this embodiment of the present invention, the single pin connector electrical outlet panel 100 may be configured to ensure ground integrity. For example, in the embodiment shown in FIG. 2, the single pin connector electrical outlet panel 100 includes a third switch

118, e.g., a relay switch, that is connected in series with the first one of the switches, e.g., switch 114*a*. In the embodiment shown, the third switch 118 is a normally-open relay switch. If a connection to ground is not established or is lost, then the third switch 118 is opened and thereby causes the overcurrent device 120 to be tripped and the single pin outlets 112*a* to 112*f* to be de-energized. Thus, the third switch 118 prevents electrical power from being supplied to the single pin outlets 112*a* to 112*f* unless a connection to ground is established and maintained. Also, FIG. 2 illustrates an arrangement having. e.g., a LINE, a LOAD, a circuit relay CR1, various (e.g., nine) fuses and various (e.g., two) variable resistors, which function in a conventional manner.

The present invention, according to various embodiments thereof, may be employed in a variety of different applications. Most commonly, single pin connector electrical outlet panels are employed in the entertainment industry, particularly in venues in which there is a need for power distribution to portable equipment, e.g., theaters, fairs, film studios, etc. However, single pin connector electrical outlet panels are also employed in many other industries, such as mining, marine, water treatment, etc. In this regard, the cam-lock mechanism employed in most single pin connector electrical outlet panels provides for a simple and effective way for equipment to be connected and disconnected to an electrical power supply.

The single pin connector electrical outlet panel, according to the various embodiments of the present invention described herein, provides provide additional safety features as compared to conventional single pin connector electrical outlet panels. As mentioned previously, one of the problems associated with conventional single pin connector electrical outlet panels is the fact that the single pin outlet has a brass contact that is tube-shaped and that is typically large enough to have inserted therein a finger or other foreign object. When power is supplied to these single pin outlets, e.g., often 400 amps AC @ 240V, the insertion of a finger or other foreign object into the single pin outlet may result in serious injury or death. While the danger of electrocution is lessened when the single pin connector electrical outlet panel is located in restricted areas accessible only to qualified personnel, many of these single pin connector electrical outlet panels are located in areas where they are accessible to the general public. The present invention greatly reduces the likelihood of electrocution to any person to which the panel is accessible in that the single pin connector electrical outlet panel, in accordance with various embodiments thereof, prevents electrical power from being provided to all of the single pin outlets unless all of the single pin outlets have a pin properly inserted therein. When a pin is properly inserted in all of the single pin outlets, a person is prevented from inserting a finger or other foreign object into any of the single pin outlets. When any one single pin outlet does not have a pin properly inserted therein, a person may insert a finger or other foreign object into the open single pin outlet without danger of electrocution because the single pin outlets are de-energized. Thus, the single pin connector electrical outlet panel of the present invention ensures the safety of any person that may come in contact with it, regardless of whether the single pin connector electrical outlet panel is located in an area accessible to the general public or not.

Those skilled in the art will appreciate that numerous modifications of the exemplary example embodiments described hereinabove may be made without departing from the spirit and scope of the invention. Although various exemplary example embodiments of the present invention have been described and disclosed in detail herein, it should be understood that this invention is in no sense limited thereby and that its scope is to be determined by that of the appended claims.

What is claimed is:

1. A device for providing electrical power comprising:

at least two single pin outlets;

at least two normally closed switches connected to each other in parallel, each one of the at least two switches coupled to a respective one of the at least two single pin outlets, and each one of the at least two switches actuatable by insertion of a pin in the single pin outlet; and a current device coupled to the at least two switches and configured to prevent the flow of electrical current to the at least two single pin outlets unless all of the at least two switches are actuated.

2. The device of claim 1, wherein the device further comprises:

a shunt trip connected to the current device and configured upon activation to de-energize the current device; and a second switch, the second switch connected to the at least two switches and to the shunt trip.

3. The device of claim 2, wherein the second switch is normally open, and is configured such that when any of the at least two switches are closed, the second switch is caused to close and activate the shunt trip to de-energize the current device.

4. A device for providing electrical power comprising:

at least two single pin outlets;

at least two normally open switches connected to each other in series, each one of the at least two switches coupled to a respective one of the at least two single pin outlets, and each one of the at least two switches actuatable by insertion of a pin in the single pin outlet;

a current device coupled to the at least two switches and configured to prevent the flow of electrical current to the at least two single pin outlets unless all of the at least two switches are actuated;

a shunt trip connected to the current device and configured upon activation to de-energize the current device; and a second switch, the second switch connected to the at least two switches and to the shunt trip, wherein the second switch is normally closed, and is configured such that when any of the at least two switches are closed, the second switch is caused to open and activate the shunt trip to de-energize the current device.

* * * * *